Figure 1:
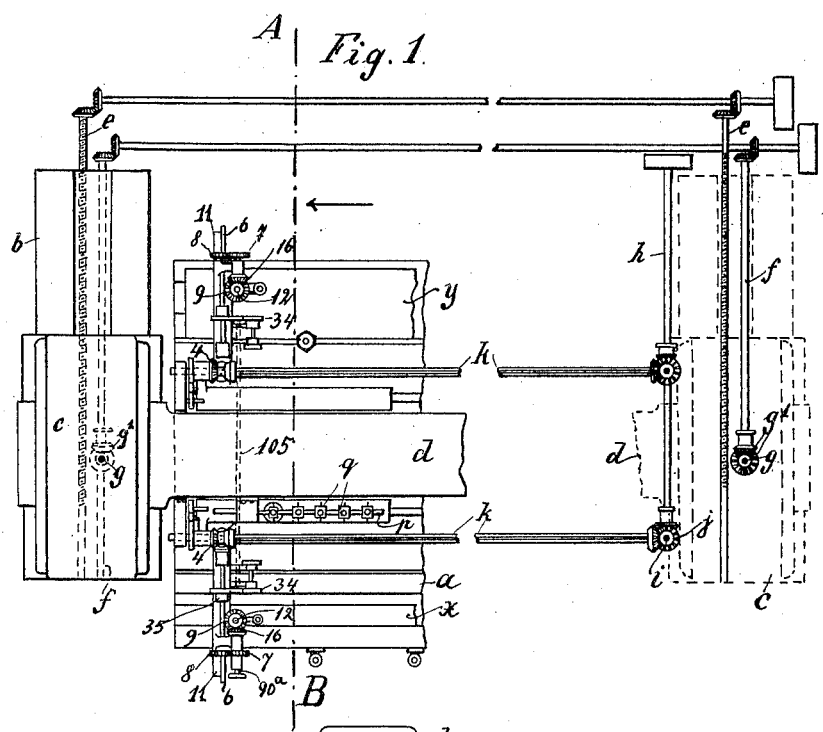

R. KOLASSA.
MACHINE TOOL.
APPLICATION FILED MAY 26, 1913.

1,087,784.

Patented Feb. 17, 1914.

Witnesses

Inventor
Anton Kolassa.

By _____ Atty.

UNITED STATES PATENT OFFICE.

ANTON KOLASSA, OF VIENNA, AUSTRIA-HUNGARY.

MACHINE-TOOL.

1,087,784.

Specification of Letters Patent. Patented Feb. 17, 1914.

Application filed May 26, 1913. Serial No. 770,066.

*To all whom it may concern:*

Be it known that I, ANTON KOLASSA, a subject of the Emperor of Austria-Hungary, residing at Vienna, Austria-Hungary, have invented new and useful Improvements in Machine-Tools, of which the following is a specification.

This invention relates to machines for boring, punching or stamping of a series of holes in rolled metal or the like, without first having to center the same. Machines of such character have become known by my Patent No. 1046394 according to which the accurate registering of the holes made by a tool, drill or the like moving over the fixed piece of work is attained by means of a series of stops arranged on detachable rails in accordance with the holes to be produced, and with which a movable sleeve arranged on the slide of the machine tool is adapted to coöperate. My said Patent 1046394 also describes a machine in connection with which a plurality of independent boring or other tools may be employed operating side by side on one and the same piece of work. For positioning the series of holes in a constant distance from the edge of the work piece whether the latter be straight or irregular or curved, the known machines are provided with a guiding device following the outline of the edge of the metal and positively moving the tool in a transverse direction as regards the work so that the axis of the tool will always be in said constant distance from the edge of the work-piece. If it is intended to form the holes in a plurality of irregular or differently curved work-pieces which are to be connected later on, it is difficult to cause them to register if the connection of the pieces is to be effected, as the positions of the holes in each work-piece depend on the curvature or irregularity of the edge of the latter.

According to the present invention each machine tool of the class specified is coupled in such a way with a second tool as to simultaneously form holes in a second work-piece adapted to be connected with the work-piece worked on by the former tool, that the position of the said second tool as regards its work piece is independent of the configuration of the edge of the latter, but dependent on the position of the former machine tool. By the compound-arrangement of the tools the advantage is obtained that the holes in the second piece of work are positively positioned precisely in the same line as the holes in the former working piece and fit exactly over the latter holes, even if the working pieces are different in shape or have differently curved or irregular edges.

In order to render the present invention easily intelligible, reference is had to the accompanying drawing.

Figure 2:
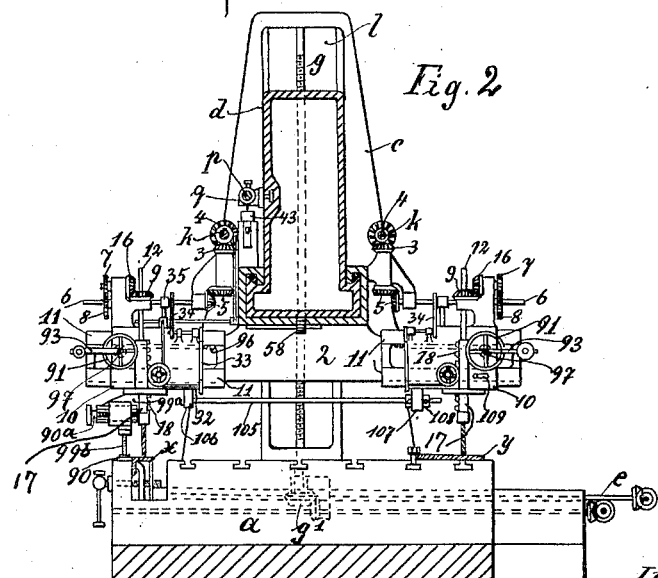

Figure 1 is a diagrammatic plan of the machine and Fig. 2 a vertical section on line A—B of Fig. 1.

$a$ is the bed of the machine having guideways $b$ on which the standards $c$ may be adjusted by means of screw spindles $e$ being simultaneously turned by machine power. $d$ is a carriage extending across the bed and being guided in slots $l$ of said standards $c$. The carriage $d$ is vertically adjustable on screws $g$ which may be rotated from shafts $f$ by means of bevel gears $g^1$ slidably mounted on said shafts.

A rail $p$ carrying adjustable and detachable stops $q$ is detachably mounted on the front side of the carriage $d$ which is provided with suitable guides at its lower part for carrying the support 2 of the boring machines or the like.

The support 2 is moved along the carriage $d$ by means of a suitably driven gear 58 which engages a rack at the under side of the carriage and is mounted on a shaft arranged in suitable bearings of the support. The latter is provided with a centering sleeve 43 which coöperates with the stops $q$ in such a manner that the support 2 is automatically stepwise moved along the carriage $d$ from one of the said stops to the others between the periods of working of the boring machines or the like.

While all aforementioned parts are similar to those described in my said Patent No. 1046394, the support 2 possesses according to the present invention two arms 11 projecting at the front and rear side of the carriage $d$. Each of said arms 11 carries a slide 10 which is adapted to move toward and from the carriage $d$ and provided with suitable bearings for the holder 12 of the boring tool or the like. Each holder 12 derives its rotation from a shaft $h$ driven from any suitable source of power, through the medium of shafts $i$, $k$, bevel gears $j$, 4, 3, 5, shaft 6, cog wheels 8, 7 and bevel gears 16, 9. A simultaneous movement of each holder 12 in the vertical direction is effected by means of a rack 18 mounted on a rotatable sleeve 17 of the holder 12, suitable tooth gears and belt-gearings 33, 34, 35 driven by the shaft 6, all substantially as described in my said Patent No. 1046394.

The arms 11 are each provided with a rack 96 in which a gear engages mounted on a shaft 97. The latter is mounted in the slide 10 and carries a handwheel 91 which may be coupled to a lever 93 loosely mounted on the shaft 97. The lever 93 is provided with a weight which tends to turn the handwheel 91, shaft 97 and its gear if the lever is coupled by any suitable means with the wheel 91. In turning the shaft 97 with its gear by hand or automatically through the loaded lever 93, the gear will coöperate with the rack 96 and thus control the position of the slide 10 with the boring mechanism; this movement will be enabled by mounting all the power transmitting members slidable on their respective shafts. One of the slides 10 of the said two boring mechanisms possesses at the lower part an arm 99$^a$ forming a horizontal guideway for the support of a vertically adjustable spindle 99$^b$ carrying a roll 90 at the lower end thereof. During the aforesaid stepwise movement of the support along the carriage $d$ the said roll 90 runs along the edge of the work piece $x$ clamped to the bed $a$ beneath the boring mechanism or the like which is carried by the said slide 10. The roll 90 is horizontally adjustable on the arm 99$^a$ by means of a screw 90$^a$. When the machine commences working, the roll 90 is adjusted to the desired distance of the holes from the edge of the work $x$. The weight of the lever 93 will always hold the guide roll 90 against the edge of the work and if the piece of work $x$ is not quite straight or curved, the lever 93 will cause the handwheel 91 to turn and with it the shaft 97, so that the slide 10 and with it its boring mechanism will be correspondingly adjusted. Thus, the distance of the center of the boring tool or the like from the edge of the work $x$ will always be kept constant. A second work piece $y$ which is to be connected later on with the work $x$ is clamped beneath the second boring mechanism or the like and may be of any suitable shape. In order to form a series of holes in the said second piece of work $y$ exactly in the same relative positions as the holes in the former piece of work $x$, being under the influence of guide roll 90, the slides 10 of the two machines, arranged on said common support 2, are connected by means of a rod 105. One end of said rod 105 is fixedly secured to a lug 106 projecting from the lower side of the slide 10 of the left hand machine, while the other end is adjustably and detachably secured to a lug 107 arranged on the under side of the slide 10 of the second (right hand) boring machine. The connection between the rod 105 and the lug 107 may be effected by means of rings or nuts 108 or the like securely fixed on the rod 105 and tightened up against the lug 107. Thus, the slide 10 of the right hand machine will perform exactly the same movements as the slide 10 of the left hand machine which produces the holes in the irregular or curved work piece $x$ in a constant distance of its edge. By means of this, the relative position of the holes in the work piece $y$ corresponds exactly to that of the holes in the work $x$ but is independent of the shape or form of the piece of work $y$. In case of need the rings 108 may be loosened whereby the machines are disconnected in which case the right hand slide 10 could be fixed to the support-arm 11 by means of a set screw 109 or the like so that the holes performed by this machine will be arranged in a straight line.

The drawing shows only one pair of boring machines coupled together but it is self-evident that a plurality of supports 2 could be arranged side by side on the carriage $d$, in which case a pair of boring machines or the like is mounted on each support.

I claim as my invention:—

1. In a machine of the class specified, a vertically and horizontally adjustable carriage, and a rail with adjustable stops detachably mounted on the same, a support mounted to slide along said carriage and provided with two forwardly and backwardly extending arms, two machine tools having slides each mounted on one of said arms, means for adjusting the slides to and from the said carriage including a bar located under the carriages and connecting the two slides, means for automatically stopping said support at each of the said stops consecutively and means for intermittently moving the said support from one stop to the next between the working periods.

2. In a machine of the class specified, a vertically and horizontally adjustable carriage, and a rail with adjustable stops detachably mounted on the same, a support mounted to slide along said carriage and provided with two forwardly and backwardly extending arms, two machine tools having slides each mounted on one of said arms, means for adjusting the slides to and from the said carriage including a bar located under the carriage and connecting the two slides, means for automatically stopping said support at each of the said stops consecutively, means for intermittently moving the said support from one stop to the next between the working periods, adjustable means for positively controlling the distance of one of the tools from the longitudinal edge of its work, and means for supporting work pieces beneath each of the said machine tools.

3. In a machine of the class specified, a vertically and horizontally adjustable carriage, and a rail with adjustable stops detachably mounted on the same, a support mounted to slide along said carriage and provided with two forwardly and backwardly extending arms, two machine tools having slides, each mounted on one of said arms, means for adjusting the slides to and from the said carriage including a bar located under the carriage and connecting the two slides, means for automatically stopping said support at each of the said stops consecutively, means for intermittently moving the said support from one stop to the next between the working periods, an adjustable guide roll for positively automatically controlling the distance of one of the tools from the longitudinal edge of its work, connecting means between the said slides of the said two machine tools and means for supporting work pieces beneath each of the said machine tools.

ANTON KOLASSA.

Witnesses:
 HUGO RZEPPA,
 AUGUST KOLASSA.

---

Copies of this patent may be obtained for five cents each, by addressing the "Commissioner of Patents, Washington, D. C."